United States Patent [19]

Burt et al.

[11] 4,100,077
[45] Jul. 11, 1978

[54] ZIRCONATE TREATED ANTIMONY COMPOUNDS

[75] Inventors: Gerald Dennis Burt, Shaker Heights; Anton Mudrak, Broadview Heights, both of Ohio

[73] Assignee: The Harshaw Chemical Company, Cleveland, Ohio

[21] Appl. No.: 809,228

[22] Filed: Jun. 23, 1977

[51] Int. Cl.$^2$ ............................................. C09K 3/28
[52] U.S. Cl. ............................ 252/8.1; 260/45.75 B; 260/DIG. 24
[58] Field of Search ................. 252/8.1; 260/45.75 B, 260/DIG. 24

[56] References Cited

U.S. PATENT DOCUMENTS 3,816,367  6/1974  Larkin et al. ........................ 252/8.1

*Primary Examiner*—Leland A. Sebastian
*Attorney, Agent, or Firm*—Armand P. Boisselle

[57] ABSTRACT

Finely divided particulate inorganic antimony compounds which are surface-modified with an organic zirconate having the formula $$(RO)_4Zr$$

wherein each R is independently an aliphatic radical containing from one to about 18 carbon atoms are described. These surface-modified antimony compounds may be incorporated into various organic resin and elastomer systems to improve the flame-retardant properties of these materials.

10 Claims, No Drawings

ZIRCONATE TREATED ANTIMONY COMPOUNDS

BACKGROUND OF THE INVENTION

This invention relates to finely divided particulate inorganic antimony compounds, and more particularly, to antimony oxides and sulfides which are surface-modified with an organic zirconate compound.

A number of antimony compounds have been used as flame-retardants in combination with other flame-retardant for various organic resins and elastomers. One commonly used compound is antimony trioxide. One of the difficulties associated with the use of antimony compounds such as antimony oxides and antimony sulfides to improve the flame-retardant properties of flammable organic resins and elastomers is the degradation of some of the other desirable properties of the treated elastomers and resins. Although the incorporation of small amounts of antimony oxides and antimony sulfides in conjunction with organic flame-retardant compounds in flammable resins and elastomers generally improves the flame-retardant properties of the resulting products, the incorporation of such antimony compounds often has an adverse effect on other properties of the resins and elastomers such as flexural strength, impact strength, tensile strength, flexural modulus and hardness.

The above-described adverse effects are not limited to the antimony oxides and sulfides. The literature describes procedures for filling thermoplastic and other polymers with many inorganic oxides, primarily as fillers. Examples of inorganic oxides which have been used as fillers for resins and elastomers include aluminum oxide, zinc oxide, iron oxide, magnesium oxide, titanium dioxide, silicates such as kaolin clay, mica, calcium silicate and aluminum silicate, calcium carbonate such as limestone, etc. In the initial development of this art, the particulate inorganic oxide materials were introduced and blended into resins and elastomers. The resulting mixtures were molded by conventional methods such as casting, injection molding, extrusion or rotational molding to form inorganic oxide reinforced plastic articles. However, it generally was found that the properties of such filled articles were not as good as expected or desired.

Various suggestions have been made in the literature for improving the results obtained when such inorganic oxide materials are incorporated into resins and elastomers. A number of suggestions for overcoming these problems have involved the use of silicon-containing compounds, and particularly silane coupling agents.

U.S. Pat. No. 3,641,087 describes the use of brominated silane derivatives in combination with metal oxides such as antimony oxides and organic antimonates as flame-retardant additives for synthetic polymer compositions. The separate addition of metal oxides such as antimony oxide and other additives such as silanes and diallyl chlorendates to diallylic phthalate resins is described in U.S. Pat. No. 3,483,158. Such compositions are reported to be flame-retardant.

Considerable effort has been devoted to improving the flame-retardant properties of resins and elastomers in recent years, and the above discussed prior art merely is exemplary of these efforts.

SUMMARY OF THE INVENTION

This invention relates to inorganic antimony compounds which have been surface-modified with an organic zirconate, and to the use of these surface-modified antimony compounds for improving the flame-retardant properties of various resins and elastomers while minimizing the usual adverse effects on other properties. The surface modified antimony compounds of this invention comprise particulate inorganic antimony compounds which have been treated with an organic zirconate having the formula $$(RO)_4Zr$$

wherein each R is independently an aliphatic radical containing from one to about 18 carbon atoms.

The improvement in the flame-retardant and other properties of resins and elastomers is obtained by the method which comprises incorporating the above-described surface-modified antimony compound into the resin or elastomer in an amount which is effective to provide the desired flame-retardant properties. The use of the surface modified antimony compounds of this invention provides the desired improvement in flame-retardant properties while minimizing many of the adverse effects on some properties of the resulting product which otherwise may result from the use of the antimony compounds which are not surface modified in accordance with the invention.

DESCRIPTION OF THE PREFERRED EMBODIMENTS

The antimony compounds which are treated in accordance with the invention are antimony oxides and sulfides. The antimony oxide compounds which may be modified in accordance with this invention include antimony oxides such as antimony trioxide, antimony pentoxide, antimony tetroxide, antimony oxychlorides and metal antimonates such as hydrated potassium antimonate and sodium antimonate. Special pre-treatment of these antimony compounds is not required although it is preferred that the particulate antimony compounds be of suitable particle size range for incorporation into resins and elastomers in a normal manner. The presence of moisture on the surface of the particles is not detrimental and, in fact, may be preferred. Thus, hydrated antimony oxides are contemplated as being useful in the invention.

The improvements of this invention are obtained by modifying the surfaces of the particulate antimony compounds of the type described above with organic zirconates having the formula $$(RO)_4Zr$$

wherein each R independently is an aliphatic radical containing from one to about 18 carbon atoms. Specific examples of the R groups which may be present in the above formula include methyl, ethyl, n-propyl, iso-propyl, n-butyl, iso-butyl, 2-ethylhexyl, nonyl, tridecyl, stearyl, etc. Mixtures of two or more R groups and mixtures of different organic zirconates can be used to modify the surfaces of the antimony compounds in accordance with this invention.

The organic zirconate compounds utilized in this invention are available commercially and/or can be prepared by methods well known in the art. For example, organic zirconates can be prepared by reacting zirconium tetrachloride with one or more alcohols in the presence of a halogen acceptor such as ammonia or pyridine in accordance with the following reaction.

The group R is an aliphatic group as defined above.

The surface modified antimony compounds of this invention can be prepared by dissolving the desired amount of zirconate or mixture of zirconates in a suitable solvent and thereafter blending the antimony compound with the dissolved zirconate. Alcohols such as methanol and isopropanol are useful as solvents. Alternatively, the zirconate may be mixed with water or a water:alcohol mixture which is then blended with the antimony compound. Another method for accomplishing the surface modification of the antimony compounds is to intimately mix the desired amount of zirconate with the antimony compound in the absence of added solvents. The amount of zirconate added to the antimony compounds can be varied but generally will be no more than about 5% by weight based on the weight of the antimony compound. When water or solvent is utilized to facilitate the coating of the antimony compounds, the product is subjected to a drying cycle to remove the water and/or solvent. Drying times of up to about four or five hours at temperatures of about 120-130° C have provided satisfactory results.

The following examples illustrate some typical methods for preparing particulate inorganic antimony compounds which have been surface-modified with an organic zirconate. Unless otherwise indicated, all parts and percentages are by weight.

EXAMPLE 1

A solution of 15 grams of tetrabutyl zirconate in about 25 ml. of isopropanol is added over a period of one hour to 300 grams of vigorously stirred antimony trioxide in a reaction flask. The resulting powder is transferred to a jar and tumbled on a roll mill for 1 hour. The product then is dried at 120° C for three hours.

EXAMPLE 2

The procedure of Example 1 is repeated except that the zirconate utilized in this example is tetratridecyl zirconate.

EXAMPLE 3

The procedure of Example 1 is repeated except that the antimony trioxide is replaced by an equivalent amount of antimony pentoxide.

EXAMPLE 4

The procedure of Example 2 repeated except that the antimony oxide is replaced by an equivalent amount of antimony trisulfide.

EXAMPLE 5

A solution of 15 grams of tetrabutyl zirconate in 25 ml. of anhydrous methanol is added to 300 grams of antimony trioxide in the reaction flask with vigorous agitation. This mixture is transferred to a glass jar and tumbled on a roll mill for 1 hour. This mixture is then dried at 120° for about 3 hours.

EXAMPLE 6

The procedure of Example 5 is repeated except that the zirconate used in this example is tetratridecyl zirconate.

EXAMPLE 7

To 297 grams of antimony trioxide in a Waring Blender is added three grams of tetrabutyl zirconate over a period of about three minutes. The mixture is blended for an additional 15 minutes, and the desired product is obtained.

EXAMPLE 8

The procedure of Example 7 is repeated except that 300 grams of antimony trioxide is blended with three grams of tetrapropyl zirconate.

EXAMPLE 9

The procedure of Example 8 is repeated except that the zirconate is tetraisopropoyl zirconate and 15 grams of this zirconate are included in the mixture.

EXAMPLE 10

The procedure of Example 7 is repeated except that the antimony compound utilized in this example is antimony oxychloride.

EXAMPLE 11

Into a Twin-Shell Blender (available from the Patterson-Kelly Company, Inc., East Stroudsberg, Pennsylvania) there is added 6,000 grams of antimony trioxide, 80 grams of tetra-n-propyl zirconate and 50 ml. of n-propanol, and the mixture is blended for 20 minutes after all of the ingredients have been added. The mixture is transferred to drying trays and dried for three hours at 100°–105° C.

The surface-modified antimony compounds of this invention are particularly useful as additives to organic resins and elastomers for improving the flame-retardant properties of these materials when utilized in combination with known organic flame-retardant compositions. The use of combinations of organic flame-retardant compositions with inorganic antimony compounds such as antimony oxides and sulfides to improve the flame-retardant properties of resins and elastomers is known but, as mentioned above, the incorporation of antimony oxide or antimony sulfide generally has adverse effects on a number of the other desirable properties of the resins and elastomers such as strength, hardness, elongation, etc. It now has been found that the particulate inorganic antimony compounds which have been treated with the zirconates in accordance with the invention improve the flame-retardant properties of these resins and elastomers, and further, provide these desirable results while minimizing or overcoming the normal adverse effects of such antimony compounds.

The surface-modified antimony compounds of the invention can be used in a wide variety of organic resins and elastomers. Examples of thermosetting resins which can be treated with the antimony compounds of the invention include: phenolic resins, alkyd resins, epoxy resins, polybutadiene resins, crosslinked polyethylene resins, urethanes and polyimides resins. Examples of thermoplastic resins include: polyamides, ABS polycarbonates, polyesters, polyethylenes, polypropylenes, polystyrene and polyvinyl chlorides. A number of elastomeric materials can be treated with the surface-modified antimony compounds and these include: neoprene, nitriles, polybutadienes, polyisoprenes, polysulfides, SBR, and urethanes.

The surface-modified antimony compounds of this invention can be incorporated into the above resins and elastomers at any suitable stage in the manufacture of the polymer composition. Thus, the antimony compounds may be added to a monomer prior to polymerization or, as may often be more convenient, to an already formed polymer. Other conventional constituents of polymer compositions such as fillers, plasticizers, pigments and stabilizers also may be incorporated in amounts which are well known to those skilled in the art to provide various desirable properties.

The amount of the surface modified antimony compound incorporated into the organic resins and elastomers can vary over a wide range depending upon the type of resin and the other ingredients of the resin or elastomer. Generally, amounts up to about 15% by weight of the surface-modified antimony compounds can be incorporated into the organic resin or elastomer.

The following examples illustrate resin and elastomer systems containing the treated antimony compounds of the invention:

| | Parts By Weight |
|---|---|
| Example A | |
| Polyester Resin "Paraplex" P-43 (available from Rohm & Haas) catalyzed with 1% "Luperco" ATC, an organic peroxide from Wallace and Tiernan, Inc. Lucidol Division | 100 |
| Product of Example 1 | 10 |
| Halogen containing flame-retardent | 10 |
| Example B | |
| "Paraplex" P-38 catalyzed with 1% "Luperco" ATC | 100 |
| Product of Example 2 | 10 |
| Halogen-containing flame-retardant | 10 |
| Example C | |
| Polypropylene resin 5524-1 (from Shell Chemical Co.) | 100 |
| Clay | 40 |
| Product of Example 11 | 10 |
| Halogen-containing flame-retardant | 8 |

The embodiments of the invention in which an exclusive property or privilege is claimed are defined as follows:

1. A finely divided particulate inorganic antimony compound surface-modified with an organic zirconate having the general formula $$(RO)_4Zr$$

wherein each R is independently an aliphatic radical containing from one to about 18 carbon atoms.

2. The compound of claim 1 wherein the antimony compound is surface-modified with up to about 10% by weight of the zirconate.

3. The compound of claim 1 wherein the antimony compound is an antimony sulfide.

4. The compound of claim 1 wherein the antimony compound is antimony oxide, antimony oxychloride or a metal antimonate.

5. The compound of claim 4 wherein the antimony oxide is antimony trioxide or antimony pentoxide.

6. A method of improving the flame-retardant properties of organic resins and elastomers comprising incorporating into said resin or elastomer, an amount of the surface-modified antimony compound of claim 1 which is effective to improve the flame-retardant properties.

7. The method of claim 6 wherein the resin is a thermoplastic resin.

8. The method of claim 6 wherein up to about 15% by weight of the surface-modified antimony compound is incorporated into the resin or elastomer.

9. The method of claim 6 wherein the antimony compound is an antimony oxide.

10. An organic resin or elastomer containing up to about 15% by weight of the surface-modified antimony compound of claim 1.

* * * * *